United States Patent
Do et al.

(10) Patent No.: US 9,250,967 B2
(45) Date of Patent: Feb. 2, 2016

(54) MODEL-BASED PLANNING WITH MULTI-CAPACITY RESOURCES

(75) Inventors: Minh Binh Do, Mountain View, CA (US); Wheeler Ruml, Palo Alto, CA (US); Rong Zhou, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 1349 days.

(21) Appl. No.: 11/807,473

(22) Filed: May 29, 2007

(65) Prior Publication Data

US 2008/0301690 A1 Dec. 4, 2008

(51) Int. Cl.
*G06F 9/50* (2006.01)
*G03G 15/06* (2006.01)
*G06Q 10/06* (2012.01)

(52) U.S. Cl.
CPC ............ *G06F 9/5016* (2013.01); *G06F 9/5011* (2013.01); *G03G 15/06* (2013.01); *G06Q 10/06* (2013.01)

(58) Field of Classification Search
None
See application file for complete search history.

(56) References Cited

U.S. PATENT DOCUMENTS

| | | |
|---|---|---|
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,008,713 A | 4/1991 | Ozawa et al. |
| 5,080,340 A | 1/1992 | Hacknauer et al. |
| 5,095,342 A | 3/1992 | Farrell et al. |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,710,968 A | 1/1998 | Clark et al. |
| 5,778,377 A | 7/1998 | Marlin et al. |
| 5,884,910 A | 3/1999 | Mandel |
| 5,995,721 A | 11/1999 | Rourke et al. |

(Continued)

OTHER PUBLICATIONS

Wuertz, Jorg, "Oz Scheduler: A Workbench for Scheduling Problems", Proceedings of the 8th IEEE Int'l Conf. on Tools with Artificial Intelligence; Toulouse, Nov. 16-19, 1996, Los Alamitos, CA: IEEE Computer Soc., Nov. 16, 1996, pp. 149-156.

(Continued)

*Primary Examiner* — Qing Wu
(74) *Attorney, Agent, or Firm* — Fay Sharpe LLP

(57) ABSTRACT

Systems and methods are described that facilitate performing model-based planning techniques for allocations of multi-capacity resources in a machine. The machine may be, for instance, a printing platform, such as a xerographic machine. According to various features, the multi-capacity resource may be a sheet buffer, and temporal constraints may be utilized to determine whether an insertion point for a new allocation of the sheet buffer is feasible. Multiple insertion points may be evaluated (e.g., serially or in parallel) to facilitate determining an optimal solution for a print job or the like.

18 Claims, 6 Drawing Sheets

(56) References Cited

U.S. PATENT DOCUMENTS

| | | | |
|---|---|---|---|
| 6,059,284 A | 5/2000 | Wolf et al. | |
| 6,097,500 A * | 8/2000 | Fromherz | 358/1.8 |
| 6,125,248 A | 9/2000 | Moser | |
| 6,241,242 B1 | 6/2001 | Munro | |
| 6,297,886 B1 | 10/2001 | Cornell | |
| 6,341,773 B1 | 1/2002 | Aprato et al. | |
| 6,384,918 B1 | 5/2002 | Hubble, III et al. | |
| 6,450,711 B1 | 9/2002 | Conrow | |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,819,906 B1 | 11/2004 | Herrmann et al. | |
| 6,925,283 B1 | 8/2005 | Mandel et al. | |
| 6,959,165 B2 | 10/2005 | Mandel et al. | |
| 6,973,286 B2 | 12/2005 | Mandel et al. | |
| 7,024,152 B2 | 4/2006 | Lofthus et al. | |
| 7,123,873 B2 | 10/2006 | deJong et al. | |
| 7,162,172 B2 | 1/2007 | Grace et al. | |
| 7,188,929 B2 | 3/2007 | Lofthus et al. | |
| 7,206,532 B2 | 4/2007 | Lofthus et al. | |
| 7,206,536 B2 | 4/2007 | Julien | |
| 2002/0078012 A1 | 6/2002 | Ryan et al. | |
| 2002/0103559 A1 | 8/2002 | Gartstein | |
| 2003/0077095 A1 | 4/2003 | Conrow | |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0247365 A1 | 12/2004 | Lofthus et al. | |
| 2005/0278303 A1 * | 12/2005 | Ruml et al. | 707/3 |
| 2006/0039026 A1 * | 2/2006 | Lofthus et al. | 358/1.15 |
| 2006/0066885 A1 | 3/2006 | Anderson et al. | |
| 2006/0067756 A1 | 3/2006 | Anderson et al. | |
| 2006/0067757 A1 | 3/2006 | Anderson et al. | |
| 2006/0114313 A1 | 6/2006 | Moore | |
| 2006/0114497 A1 | 6/2006 | Anderson et al. | |
| 2006/0115287 A1 | 6/2006 | Roof | |
| 2006/0115288 A1 | 6/2006 | Roof | |
| 2006/0132815 A1 | 6/2006 | Lofthus et al. | |
| 2006/0176336 A1 | 8/2006 | Moore et al. | |
| 2006/0197966 A1 | 9/2006 | Viturro et al. | |
| 2006/0209101 A1 | 9/2006 | Mizes | |
| 2006/0214359 A1 | 9/2006 | Clark | |
| 2006/0214364 A1 | 9/2006 | Clark et al. | |
| 2006/0215240 A1 | 9/2006 | Mongeon | |
| 2006/0221159 A1 | 10/2006 | Moore et al. | |
| 2006/0221362 A1 | 10/2006 | Julien et al. | |
| 2006/0222384 A1 | 10/2006 | Moore et al. | |
| 2006/0222393 A1 | 10/2006 | de Jong et al. | |
| 2006/0227350 A1 | 10/2006 | Crawford et al. | |
| 2006/0230201 A1 | 10/2006 | Fromherz et al. | |
| 2006/0230403 A1 | 10/2006 | Crawford et al. | |
| 2006/0233569 A1 | 10/2006 | Furst et al. | |
| 2006/0235547 A1 | 10/2006 | Hindi et al. | |
| 2006/0238778 A1 | 10/2006 | Mongeon et al. | |
| 2006/0244980 A1 | 11/2006 | Grace | |
| 2006/0250636 A1 | 11/2006 | Richards | |
| 2006/0268317 A1 | 11/2006 | Lofthus et al. | |
| 2006/0268318 A1 | 11/2006 | Lofthus et al. | |
| 2006/0269310 A1 | 11/2006 | German et al. | |
| 2006/0274334 A1 | 12/2006 | Mongeon | |
| 2006/0274337 A1 | 12/2006 | Dalal et al. | |
| 2006/0280517 A1 | 12/2006 | Roof et al. | |
| 2006/0285159 A1 | 12/2006 | Frankel | |
| 2006/0285857 A1 | 12/2006 | Swift | |
| 2007/0002085 A1 | 1/2007 | Sampath et al. | |
| 2007/0002344 A1 | 1/2007 | Klassen | |
| 2007/0002403 A1 | 1/2007 | Klassen | |
| 2007/0024894 A1 | 2/2007 | Moore et al. | |
| 2007/0031170 A1 | 2/2007 | deJong et al. | |
| 2007/0041745 A1 | 2/2007 | Dalal et al. | |
| 2007/0052991 A1 | 3/2007 | Goodman et al. | |
| 2007/0081064 A1 | 4/2007 | Spencer et al. | |
| 2007/0081828 A1 | 4/2007 | Radulski et al. | |
| 2007/0120934 A1 * | 5/2007 | Lang | B41J 3/54 347/104 |

OTHER PUBLICATIONS

EP Search Report, Appl. No. 08157087.1-2211 / 1998247, Dated Nov. 24, 2008, Munich, Germany.
Morgan, P.F., "Integration of Black Only and Color Printers", Xerox Disclosure Journal, vol. 16, No. 6, Nov./Dec. 1991, pp. 381-83.
Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2005, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.
U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006, Meetze.
U.S. Appl. No. 11/495,017, filed Jul. 28, 2006, Bean.
U.S. Appl. No. 11/501,654, filed Aug. 9, 2006, Mestha et al.
U.S. Appl. No. 11/522,171, filed Sep. 15, 2006, Sampath et al.

(56) References Cited

OTHER PUBLICATIONS

U.S. Appl. No. 11/528,770, filed Sep. 27, 2006, Degruchy.
U.S. Appl. No. 11/595,630, filed Nov. 9, 2006, Moore.
U.S. Appl. No. 11/590,432, filed Oct. 31, 2006, Moore.
U.S. Appl. No. 11/636,747, filed Dec. 11, 2006, Mestha et al.
U.S. Appl. No. 11/636,901, filed Dec. 11, 2006, Banton et al.
U.S. Appl. No. 11/639,073, filed Dec. 14, 2006, Biegelsen et al.
U.S. Appl. No. 11/643,119, filed Dec. 21, 2006, Clark et al.
U.S. Appl. No. 11/656,992, filed Jan. 23, 2007, Sampath et al.
U.S. Appl. No. 11/708,298, filed Feb. 20, 2007, Lang.
U.S. Appl. No. 11/714,016, filed Mar. 5, 2007, Furst.

* cited by examiner

MODEL-BASED PLANNING WITH MULTI-CAPACITY RESOURCES

CROSS REFERENCE TO RELATED PATENTS AND APPLICATIONS

The following patents/applications, the disclosures of each being totally incorporated herein by reference are mentioned:

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. Publication No. US-2006-0132815-A1, Published Jun. 22, 2006, entitled "PRINTING SYSTEMS," by Robert M. Lofthus, et al.;

U.S. Publication No. US-2006-0227350-A1, Published Oct. 12, 2006, entitled "SYNCHRONIZATION IN A DISTRIBUTED SYSTEM," by Lara S. Crawford, et al.;

U.S. Publication No. US-2006-0230403-A1, Published Oct. 12, 2006, entitled "COORDINATION IN A DISTRIBUTED SYSTEM," by Lara S. Crawford, et al.;

U.S. Publication No. US-2006-0230201-A1, Published Oct. 12, 2006, entitled "COMMUNICATION IN A DISTRIBUTED SYSTEM," by Markus P. J. Fromherz, et al.;

U.S. Publication No. US-2006-0235547-A1, published Oct. 19, 2006, entitled "ON-THE-FLY STATE SYNCHRONIZATION IN A DISTRIBUTED SYSTEM," by Haitham A. Hindi;

U.S. application Ser. No. 11/122,420, filed May 5, 2005, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/359,065, filed Feb. 22, 2005, entitled "MULTI-MARKING ENGINE PRINTING PLATFORM", by Martin E. Banton;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.;

U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.

BACKGROUND

As processing power and memory capacity increase, a need arises for control mechanisms that permit a machine to fully exploit system capabilities. In the case of printers, photocopiers, and the like, conventional control mechanisms are limited in the manner in which they process information, allocate resources, perform jobs or tasks, etc. When designing a control system for a machine, it is desirable to optimize resource allocation and utilization in order to reduce cost and increase throughput. For instance, a resource that is capable of multiple concurrent allocations may be employed to provide improved performance in a machine, such as a printer or photocopier. Traditionally, a single resource could be allocated to a single component or for a single task at a given time. However, in the case of multi-capacity resources (e.g., resources capable of multiple allocations at a given time), control mechanisms to date have failed to provide planning and scheduling mechanisms that optimize resource capacity.

For instance, some attempts at control optimization for multi-function, multi-resource parallel-operation systems have employed manually encoded rules, which to date have not been concluded to be optimal or complete. Other approaches, such as adding component descriptions to responsibilities associated with a planning engine may be functional but may lead to combinatorial challenges in planner performance. However, there exists an unmet need in the art for systems and/or methodologies that facilitate optimizing multi-capacity resource utilization while minimizing computational overhead to improve throughput and reduce costs associated with machine control.

BRIEF DESCRIPTION

In accordance with various aspects described herein, systems and methods are described that facilitate model-based planning of resource allocations using a multi-capacity resource. For example, a method for machine control may comprise evaluating a model of an ordered listing of allocations of a multi-capacity resource, selecting an insertion point for a new allocation into the ordered listing of allocations of the multi-capacity resource, posting one or more temporal constraints that govern an order of execution of allocations, and determining whether execution of the model is feasible after insertion of the new allocation at the selected insertion point. The method may further comprise storing the model for comparison and/or execution if it is feasible, comparing a plurality of models, each with a different selected insertion point for the new allocation, and selecting a model for execution based on a level of feasibility relative to other models. The one or more temporal constraints may comprise a first-in-first-out constraint and/or a serial constraint that ensures that an Nth preceding allocation is complete before the new allocation is started, where N is an integer.

According to another feature described herein, a system that facilitates model-based planning for a multi-capacity resource may comprise a planner that selects an insertion point for a new allocation into an ordering of existing allocations of the multi-capacity resource, a plan generator that specifies at least one temporal constraint on allocations of the multi-capacity resource, and a plan tester that determines whether a new ordering of allocations, which comprises the new allocation at the selected insertion point, is feasible in view of the specified constraints. The multi-capacity resource may be a sheet buffer in a xerographic machine, the ordering of allocations may be an ordering of pages to be passed through the sheet buffer, and the new allocation may be a new page that is inserted into the ordering of pages. Moreover, at least one temporal constraint may comprise a first-in-first-out (FIFO) constraint that ensures that a first page enters the sheet buffer before a second page enters the sheet buffer, and leaves the sheet buffer before the second page leaves the sheet buffer, as well as a capacity-based constraint that ensures that a maximum capacity associated with the sheet buffer is not exceeded. The capacity-based constraint may stipulate that a current page does not enter the sheet buffer until an Nth preceding page has left the sheet buffer, where N is an integer equal to the maximum capacity of the sheet buffer.

Yet another feature relates to a print platform, comprising one or more xerographic components that execute instructions for performing a xerographic process, a planner that selects an insertion point for a new allocation into an existing allocation ordering of a multi-capacity resource, generates an updated allocation ordering, and assigns at least one temporal constraint to govern the allocation ordering, and a plan tester that determines the feasibility of the updated allocation ordering as a function of whether the updated allocation ordering violates those ordering temporal constraints. The temporal constraints governing the allocation ordering may contain at least a first-in-first-out (FIFO) constraint and a capacity constraint that delineates a maximum capacity for the multi-capacity resource.

DETAILED DESCRIPTION

In accordance with various features described herein, a framework is presented that extends current model-based planning algorithms to mitigate a need for separate specialized software to handle a multi-capacity resource while retaining the ability of an online planner to output optimal plans. For example, by adding appropriate temporal points that represent multi-capacity resource allocations, and temporal constraints there between, a planner may determine an optimal manner in which to utilize the multi-capacity resource, given an objective function. Modeling language used by a planner may be analyzed to determine whether the planner permits different tasks to share one or more resources. In this manner, a model-based general-purpose online planner may be used to optimally control multi-capacity resources using temporal constraints.

Figure 1:
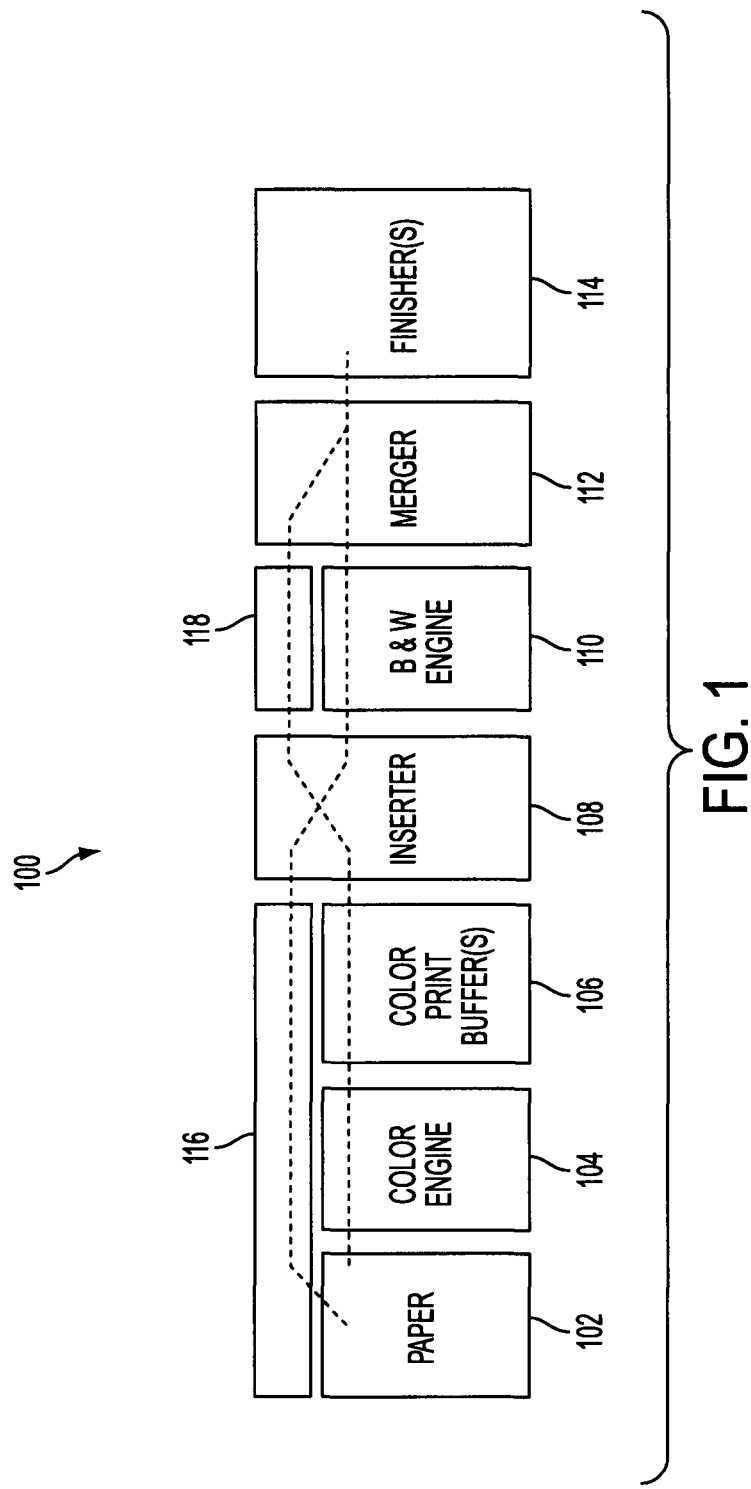
FIG. 1 illustrates a system that depicts a plurality of components, such as may be employed in a universal production printer with a color print sheet buffer.

With reference to FIG. 1, a system 100 is illustrated that depicts a plurality of components, such as may be employed in a universal production printer with a color print sheet buffer. The system 100 comprises a paper source 102, which may comprise one or more sheets of paper, and which is operatively associated with a color engine 104 and an inserter 108. Paper from the paper source 102 may follow one of two paths. For instance, paper may be routed from the paper source 102 to the color print engine 104, and on to a color print buffer 106, before entering the inserter 108. Additionally or alternatively, paper may be routed directly from the paper source 102 to the inserter 108 using the transporter 116 (e.g., bypassing the color engine 104 and the color print buffer 106).

Paper that has been routed directly from the paper source 102 to the inserter 108 may be passed to a black-and-white print engine 110, then through a merger 112 that merges black-and-white and color pages, before proceeding on to a finisher 114 that finishes the document for presentation to a user. Prior to insertion by inserter 108, paper may pass through the transporter 116. Paper that has been routed through the color print engine 104 and into the color print buffer 106 for temporary storage until such time as the color-printed page may be passed through the inserter 108 and the transporter 118 and is merged by merger 112 with other black-and-white pages that are printed by the black-and-white engine 110. It will be appreciated that according to other examples, a page may pass through all components of the system 100 and may have both color portions and black-and-white portions.

In conventional systems, although model-based planning may be employed to explicitly handle resources, typically such resources are in the form of "unit resources," where tasks can not share resources at the same time, as opposed to multi-capacity resources, which may be shared by multiple tasks or allocations. According to various features described herein, a planning framework may be created to handle multi-capacity resources in which different tasks can share a given resource up to its capacity. This type of multi-capacity resource with unrestricted allocation time can facilitate providing storage and buffer locations for materials in manufacturing domains, and thus may facilitate optimal usage of multi-capacity resources. One application for such model-based planning for multi-capacity resources is planning for tightly-integrated parallel printing (TIPP), where a sheet buffer, such as the color print sheet buffer(s) 106, can be modeled as a multi-capacity resource to enable speeding up printing jobs with mixed color and black-and-white sheets. One example of how it can be done is to print color sheets early using a slower color engine 104 and then quickly feed them out of the temporary storage buffer 106 as needed to merge with sheets printed by a faster B&W engine 110.

For example, when a manufacturing task requires a resource allocation for a multi-capacity resource R with capacity C, the planner may add temporal constraints between the new allocation and the previous allocations on R to guarantee that only up to C allocations can overlap at any given moment in time. That is, C represents a maximum allowable capacity of overlapping allocations of resource R. The planner may also select from all possible ways to add the new resource allocation to find the one leading to an optimal plan given any objective function. For example, if the objective function is to minimize overall end time to complete all tasks, then the planner may try to arrange as many overlapping resources as possible so that the resources are still within capacity while allowing the tasks to finish as soon as possible. The manner in which the planner adds and maintains temporal constraints between different allocations of multi-capacity resources need not rule out any given potential solution and need not change any property of the search algorithm used by the planner, such as completeness or optimality.

Some continuous planning/re-planning systems work in an on-line planning environment and deal with real-time constraints similar to a TIPP environment. However, such systems rely on user-defined local-rules to guide the planning and plan-repair processes, which do not guarantee either completeness or optimality. In contrast, the handling of multi-capacity resources in model-based planning as discussed here is generic, does not depend on local rules, and does not violate the completeness or optimality of the underlying search algorithm used.

Conventional systems and methods do not provide a general-purpose planning system that handles multi-capacity resources directly. Rather, a multi-capacity resource is typically handled by specialized solver or using a scheduler. By way of adding appropriate time points representing multi-capacity resource allocations and temporal constraints between them, the planning algorithms and systems described herein are able to determine an optimal manner in which to use the multi-capacity resources (leading to an optimal solution), given any objective function.

Figure 2:
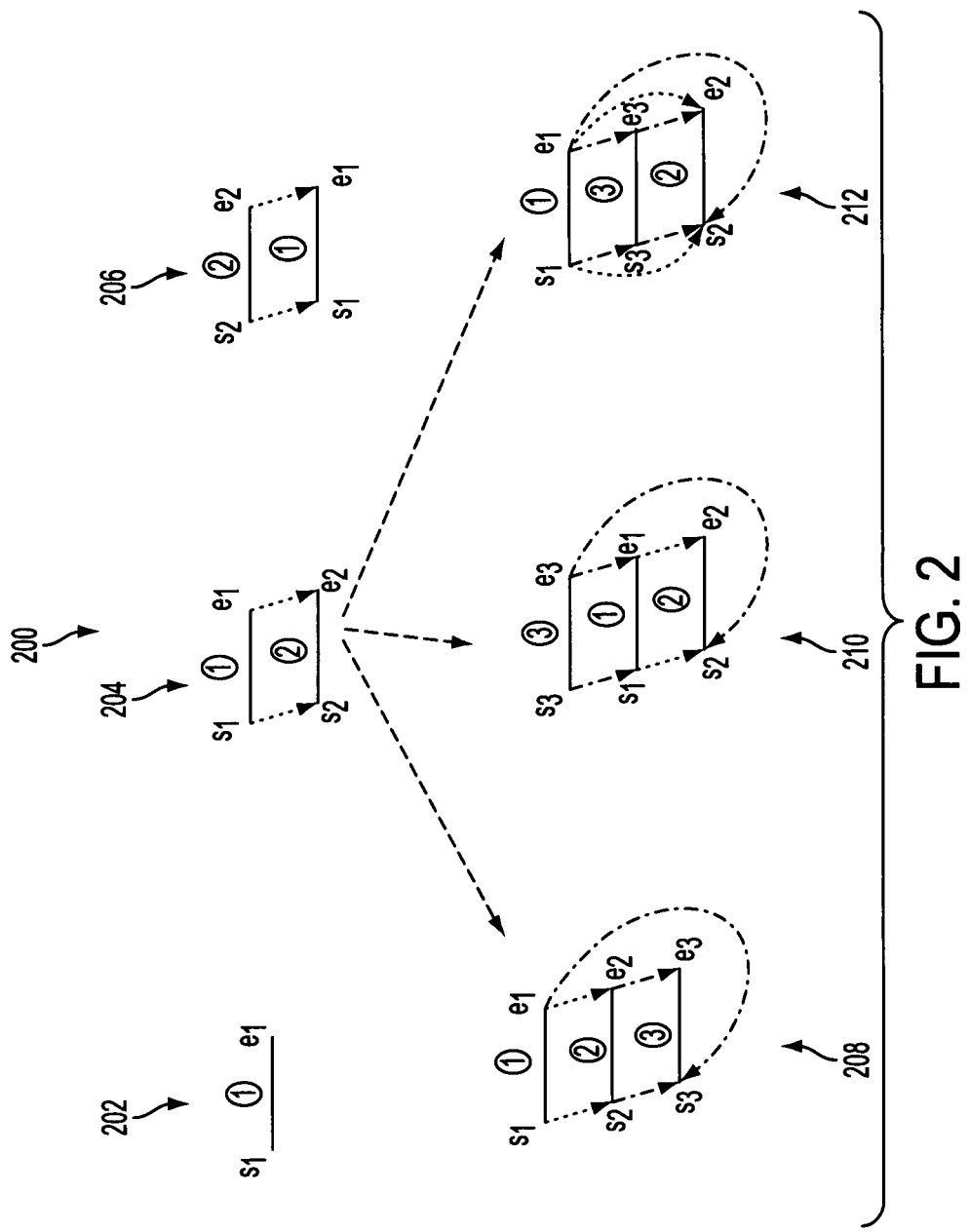
FIG. 2 is an illustration of a set of events that represents a plurality of permutations of potential planning schedules that may be employed to insert a new allocation of a multi-capacity resource into an existing ordering of allocations, in accordance with various aspects.

FIG. 2 is an illustration of a set of events 200 that represents a plurality of permutations of potential planning schedules that may be employed to insert a new allocation of a multi-capacity resource into an existing ordering of allocations, in accordance with various aspects. As described herein, planning involves choosing actions to achieve a given goal, and scheduling involves deciding when the chosen actions should take place. Planning and scheduling may be integrated to facilitate making an informed decision regarding an optimal plan. Constraints that are employed to solve scheduling problems may also be utilized as part of a constraint-based planning system. For instance, with regard to multi-capacity resources, some actions may not be performed concurrently due to resource unavailability. For example, a printer may have a print buffer (e.g., a multi-capacity resource) where pages accumulate as they await further action, and the buffer may have a limited capacity. By utilizing a temporal database and network wherein a plurality of constraints and allocation orderings may be stored and evaluated, allocation scheduling/planning models may be evaluated for feasibility to facilitate model-based planning for optimized utilization of the multi-capacity resource.

For simplicity of illustration, the resource allocations (e.g., of a resource, R) are described as having a maximum capacity, C, of 2, although any capacity may be employed in conjunction with the various features set forth herein, as will be appreciated. According to the example, a first allocation (1) is depicted, for which there is only one possible ordering, or model, 202. When a second allocation (2) is added, there are two possible orderings: ordering 204, where allocation (2) is inserted after allocation (1), and ordering 206, where allocation (2) is inserted before allocation (1). Note that the two temporal constraints (solid arrows) do not prevent the two allocations from overlapping each other in time, but rather they enforce that an allocation that starts earlier ends earlier. For example, ordering 204 illustrates that allocation (1) may start at time $s_1$ and end at time $e_1$, while allocation (2) may start at time $s_2$ and end at time $e_2$. The solid arrow from $s_1$ to $e_1$ is slanted slightly to the right (in positive time) to represent the constraint that $s_2$ occurs after $s_1$ in time, and the solid arrow from $e_1$ to $e_2$ indicates that allocation (1) is constrained to end before allocation (2) ends. Thus, allocations (1) and (2) are permitted to overlap in time so long as the constraints are adhered to.

According to another example, ordering 204 may be extended by adding another allocation (3), such that there are three possible permutations of adding allocation (3), which are shown in the scenarios 208, 210, and 212, respectively. The new constraints added in each scenario (dashed arrows) are constraints to ensure that, in any scenario, three consecutive allocations cannot overlap over a single time point. A planner employing such possible permutations to determine an optimal ordering may select the optimal ordering for further extension from among the new orderings.

To further the above example, the multi-capacity resource may be a 2-sheet-capacity sheet buffer, and constraints may be applied to ensure that only two allocations of the resource are permitted to occur at a given time. For instance, the solid arrows of 204 may represent a constraint that ensures that allocation (1) comes before allocation (2). If a third allocation is added, such as is depicted by ordering 208, then constraints may be added to enforce a temporal ordering (straight dashed arrows), as well as capacity (curved and dashed arrow), where the capacity constraint ensures that only two sheets are present in the sheet buffer at a given time. That is, the curved dashed arrow 208, which extends from $e_1$ to $s_3$, represents a constraint that allocation (1) ends before allocation (3) starts. Thus, ordering 208 illustrates that a first sheet (1) enters the buffer at a start time $s_1$ before a second sheet (2) enters the buffer at its respective start time $s_2$, and leaves the sheet buffer at and end time $e_1$ before the second sheet leaves the buffer at $e_2$. Similarly, sheet (3) may not enter the buffer until sheet (2) has entered the buffer, and may not leave the buffer until after sheet (2) has left the buffer. The curved dashed arrow shows that sheet (3) is further constrained not to enter the sheet buffer until after sheet one has left the sheet buffer, in order to enforce the two-sheet maximum allocation of the resource.

Orderings 210 and 212 illustrate other possible insertion points for sheet (3). With regard to ordering 212, the solid curved arrows represent the constraint shown in ordering 206, which may become redundant when sheet (3) is inserted between sheets (2) and (1). From a storage conservation standpoint, such redundant constraints may be deleted from, for instance, a constraint database in order to minimize storage space therein. Additionally or alternatively, a redundant constraint may be left in the constraint database in order to avoid computational overhead associated with a typically expensive deletion action. Furthermore, it will be appreciated that multiple models, such as models 208, 210, and 212, may be evaluated in parallel (e.g., rather than serially) if desired to minimize processing time. It will further be appreciated that any number of models and/or ordering permutations may concurrently be evaluated for optimization purposes, and that the described features are not limited to three models as described with regard to the above example.

Figure 3:
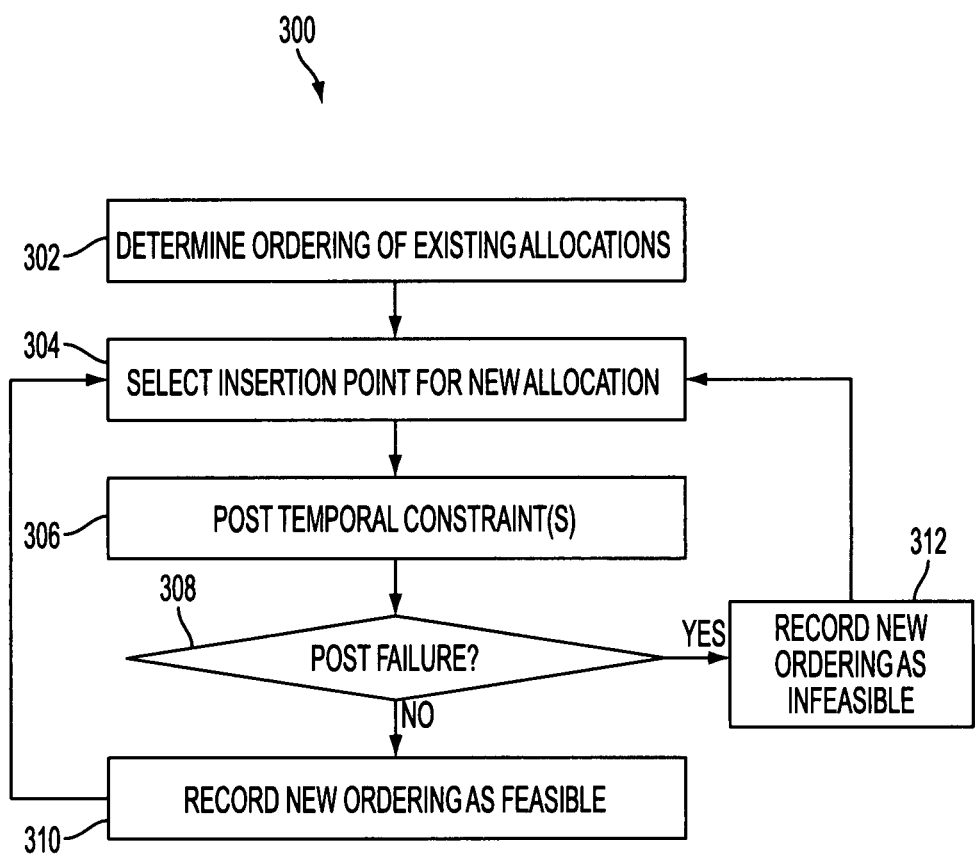
FIG. 3 is an illustration of a methodology for planning allocation orderings for a multi-capacity resource, in accordance with one or more features described herein.

FIG. 3 is an illustration of a methodology 300 for planning allocation orderings for a multi-capacity resource, in accordance with one or more features described herein. At 302, an ordering of existing allocations of a multi-capacity resource may be determined and/or evaluated. For instance, the multi-capacity resource may be a sheet buffer having a maximum capacity of N sheets, where N is an integer. At 304, an insertion point for a new allocation (e.g., such as a page) may be selected. Temporal constraints, such as those described above with regard to FIG. 2, may be posted at 306. For instance, a first temporal constraint may be added that requires a first-in-first out ordering for allocations, such that an allocation that begins using the multi-capacity resource prior to another allocation may be constrained to finish using the resource prior to the other allocation's completion of use of the resource. A second constraint may relate to ensuring that a maximum capacity of the multi-capacity resource is not exceeded. It will be appreciated that the foregoing constraints are exemplary in nature and are not intended to limit the number of constraints that may be posted for a given planning session or the manner in which constraints operate to organize allocations of a multi-capacity resource.

At 308, a determination may be made regarding whether insertion of the new allocation at the selected insertion point conflicts with a posted constraint (e.g., causes the constraint to fail). If no post failure is determined to exist, then at 310 the new ordering of allocations (with the new allocation inserted) may be recorded as a feasible ordering of allocations, and the method may revert to 304 for a further iteration of insertion point selection, constraint posting, and ordering evaluation. If it is determined at 308 that one or more posted constraints has failed, then at 312 the new ordering may be recorded as infeasible before the method reverts to 304 for evaluation of another ordering with a different insertion point for the new allocation. In this manner, multiple permutations of allocation orderings may be evaluated to facilitate selection of a desirable ordering of allocations for the multi-capacity resources. Moreover, although the evaluation of different allocation orderings having different insertion points for a new allocation are depicted as occurring serially through an iterative method in FIGS. 3-5, it is to be understood that multiple allocation orderings may be evaluated in parallel to reduce processing time associated with evaluating various ordering permutations of a given allocation set. For example, the three permutations of models 208, 210, and 212 for the addition of allocation (3) in FIG. 2 may be evaluated in parallel to minimize processing time.

Figure 4:
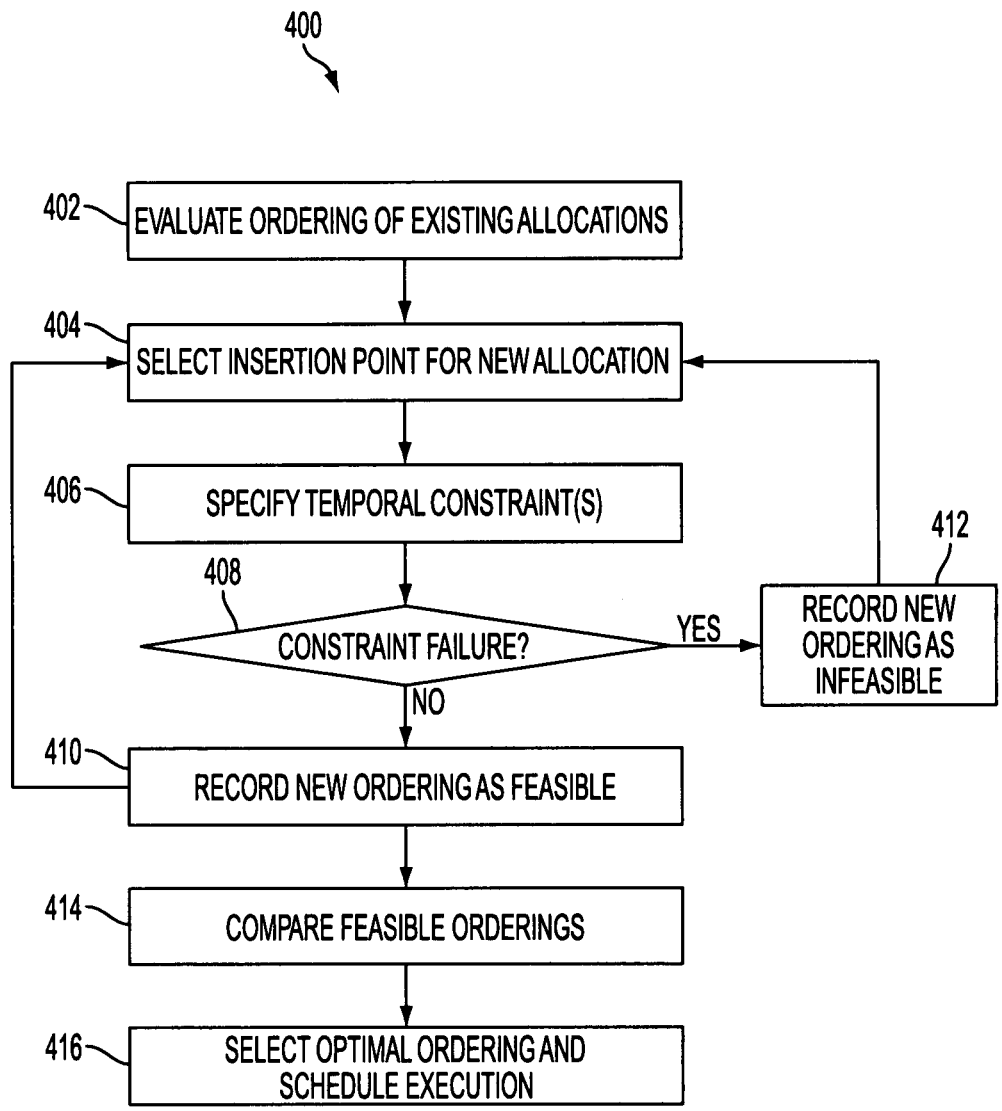
FIG. 4 illustrates a methodology for evaluating multiple possible orderings of a set of events, such as allocations of a multi-capacity resource, and selecting an optimal allocation ordering, in accordance with one or more features disclosed herein.

FIG. 4 illustrates a methodology 400 for evaluating multiple possible orderings of a set of events, such as allocations of a multi-capacity resource, and selecting an optimal allocation ordering, in accordance with one or more features disclosed herein. At 402, an extant ordering of existing allocations for a multi-capacity resource may be evaluated to facilitate selecting an insertion point for a new allocation into the ordering, which may occur at 404. At 406, one or more temporal constraints may be specified, which govern the timing of the allocations relative to each other. At 408, a determination may be made regarding whether one or more of the specified constraints has failed (e.g., whether the selected insertion point results in a valid ordering. If the determination at 408 indicates that none of the specified constraints has been violated, then at 410 the new ordering may be recorded as a feasible ordering and the method may revert to 404 for evaluation of another ordering having a different insertion point for the new allocation. If one or more specified constraints is determined to be violated by the selected insertion point, then the new ordering may be recorded as infeasible at 412, and the method may revert to 404 for evaluation of another ordering with a difference selected insertion point.

At 414 a comparison may be performed for new orderings that have been recorded as feasible. An optimal ordering may be selected and scheduled for execution at 416. According to an example, two orderings that have been recorded as feasible may be compared to determine which has a better value relative to a predefined metric. For instance, a first feasible ordering may have a shorter execution time given the set of specified constraints, and may therefore be selected over a second feasible ordering. It will be apparent to those of skill that the metric(s) by which a feasible ordering is selected over another feasible ordering is not limited to execution duration, but rather may be any suitable metric for comparing two or more feasible orderings and determining an optimal ordering based on the metric.

Figure 5:
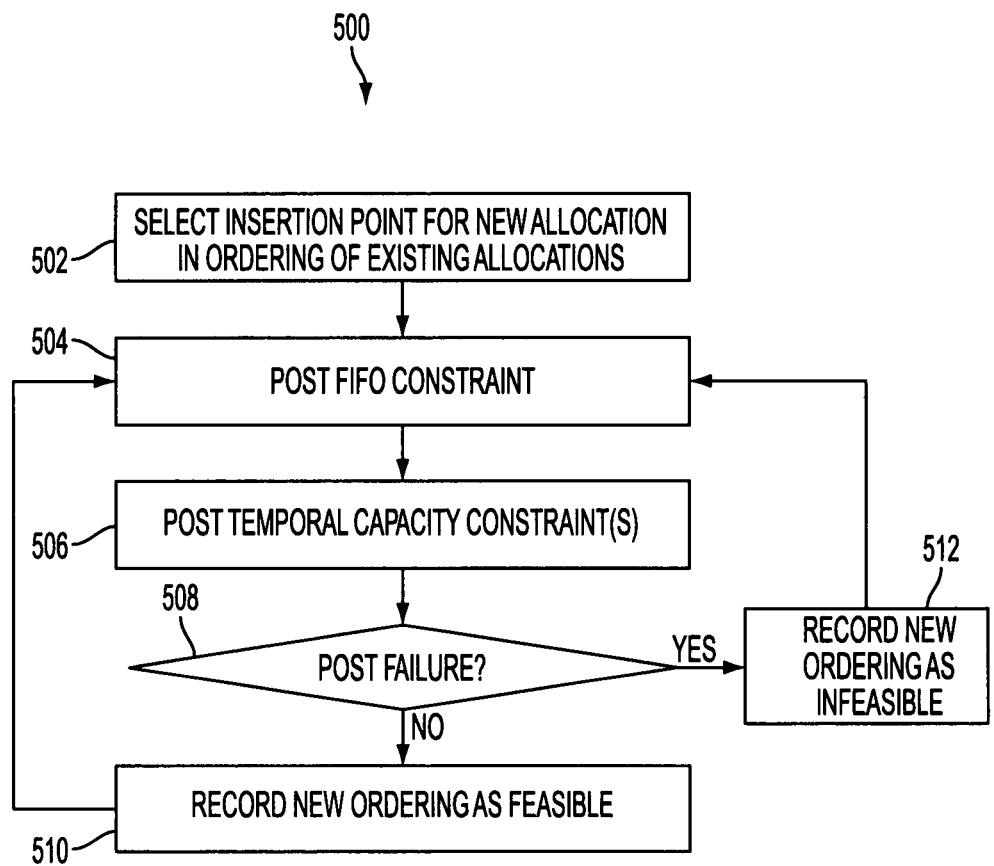
FIG. 5 is an illustration of a methodology for utilizing temporal constraints to facilitate model-based planning for multi-capacity resources.

FIG. 5 is an illustration of a methodology 500 for utilizing temporal constraints to facilitate model-based planning for multi-capacity resources. According to the figure, at 502, an insertion point may be selected for a new allocation of a multi-capacity resource in an existing ordering of multi-capacity resource allocations. For instance, the ordering of existing allocations may be defined in terms of temporal variables rather than absolute times. Thus, when a new allocation is detected, the selection of an insertion point may be relative to the timing of other allocations, and not necessarily to a specific time. At 504, a first set of temporal constraints may be posted, such as a set of first-in-first-out (FIFO) constraints, which ensure that an allocation that begins before another allocation ends before the other allocation. The FIFO constraints posted at 504 may additionally indicate the insertion point of the new allocation relative to extant allocations in the ordering.

At 506, a second set of temporal constraints may be added to ensure that, at any given time, a maximum capacity associated with the multi-capacity resource is not exceeded. For example, if the multi-capacity resource is a sheet buffer in a printer device, with a maximum capacity of 5 sheets, then the constraint posted at 506 may ensure that the fifth sheet ahead of the current sheet (e.g., the new allocation) has left the sheet buffer before the current sheet enters the buffer. A determination may be made at 508 regarding whether one or more of the constraints has failed (e.g., whether the selected insertion point for the new allocation results in an ordering that is not feasible given the posted constraints). If not, then at 510 the new ordering may be recorded (e.g., stored in a database) as a feasible ordering. If one or more of the posted constraints has failed, then at 512, the new ordering may be recorded as infeasible.

Figure 6:
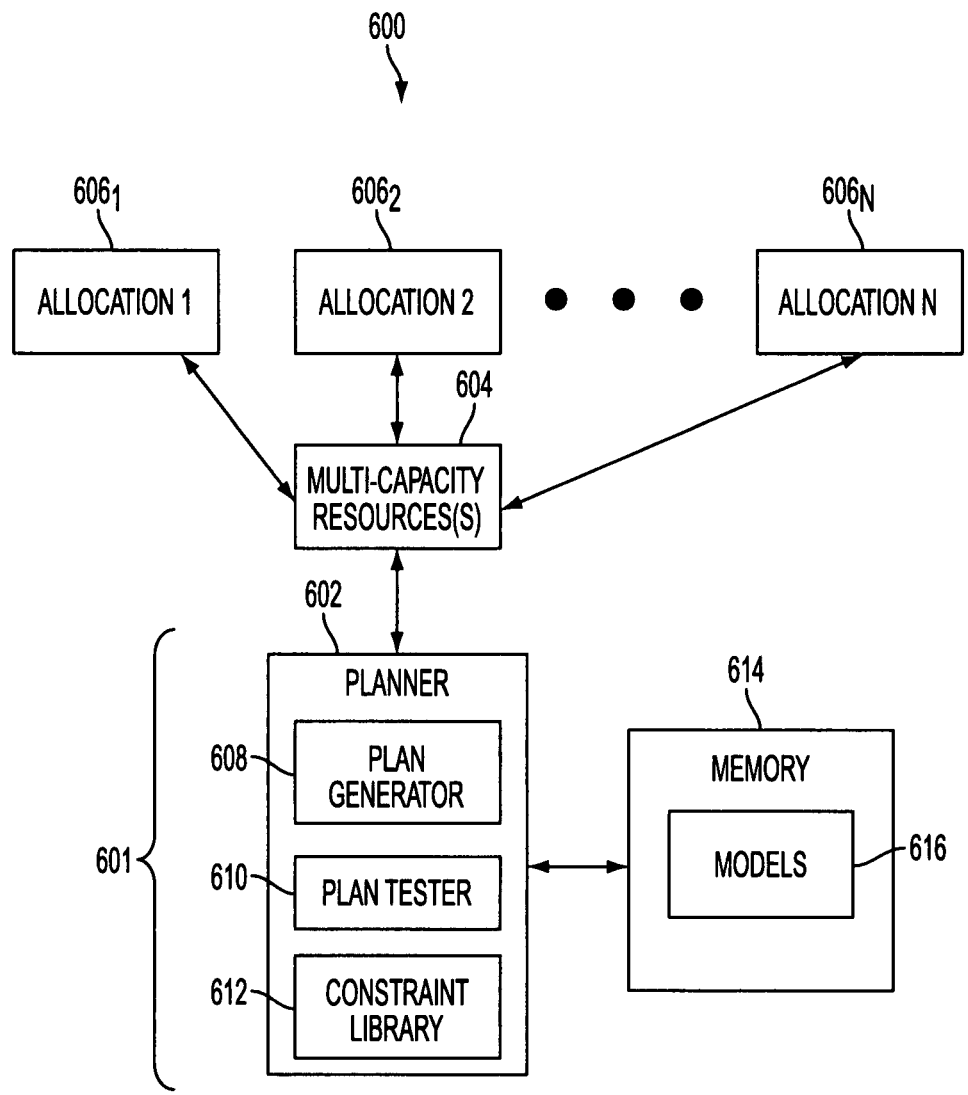
FIG. 6 is an illustration of a system that facilitates performing model-based planning for multi-capacity resource allocation, in accordance with various aspects.

FIG. 6 is an illustration of a system 600 that facilitates performing model-based planning for multi-capacity resource allocation, in accordance with various aspects. The system 600 comprises a planner 602 that evaluates a multi-capacity resource 604 and one or more allocations $606_1$-$606_N$ (collectively referred to as "allocations 606" hereinafter) thereof to identify an existing ordering of allocations 606. It is to be understood that the system 600 may comprise and/or be employed in a variety of environments, such as an electronic imaging environment, as well as a xerographic environment, whereby one or more xerographic components are utilized to perform a xerographic procedure or function. The planner 602 may comprise a plan generator 608, a plan tester 610, and a constraint library 612, and may be associated with a machine, such as a print platform as described above with regard to FIG. 1. According to some aspects, a scheduler (indicated by dotted line 601) may be provided with planning capability such as is described with regard to the planner 602. For instance, the scheduler may be operatively associated with the planner 602 to handle multi-capacity resources, and may utilize a continuous quantity handled by a general-purpose academic planner to approximate multi-capacity resources.

The plan generator 608 may select an insertion point for a new allocation of the multi-capacity resource, as detailed above with regard to the preceding figures, and may access the constraint library 612 to specify one or more constraints to govern the execution of the ordering of allocations with the inserted new allocation. For instance, constraints may comprise temporal constraints (e.g., FIFO, LIFO, etc.), capacity constraints (e.g., maximum of N allocations at a given time, where N is an integer), and the like. The plan tester 612 may evaluate a given ordering of allocations, after insertion of the new allocation, against constraints posted by the plan generator 608, to determine whether a given allocation ordering model is valid. Valid models 616 may be store in a memory 614 for later evaluation and/or implementation by planner 602.

According to an example, non-deterministic pseudo-code for allocating on a FIFO multi-capacity resource may comprise, without being limited to:

1. Given existing ordered list of existing allocations $(s_1,e_1)$, $(s_2,e_2)$, ... $(s_n,e_n)$, select a place to insert the new allocation: point $(s_i,e_i)$.
2. Post temporal constraints $s_{i-1} \rightarrow s_i$, $e_{i-1} \rightarrow e_i$, $s_i \rightarrow s_{i+1}$ and $e_i \rightarrow e_{i+1}$ to enforce the order.
3. Post temporal constraint $e_j \rightarrow s_{j+C}$ for all j such that $(i-C) \leq j \leq (i+C)$, to ensure that for every allocation, the allocation is finished before the Cth one ahead of it starts. (If any of these allocations doesn't exist, ignore its constraints.)
4. If none of the previous posts failed, record the ordering as a feasible possibility.

The above example describes pseudo-code for adding a resource allocation 606 when a planning task requires a multi-capacity FIFO resource, R, with capacity C, where C represents a maximum allowable number of overlapping (e.g., concurrent) allocations of resource R. Each allocation is represented by a pair of time points (start, end) that are assumed to be previously appropriately constrained relative to each other (e.g., separated by a fixed duration). A planner may evaluate all possible permutations of inserting a new allocation in between two consecutive existing allocations, in addition to trying to add the new allocation as the first or last allocation. It may then add constraints between all allocations within C of the new allocation to ensure that any two allocations with indexes separated by C do not overlap. For instance, if C=5, then a first and a sixth allocation may not overlap. Thus, there need not be more than C allocations of resource R at any given time. It will be noted that the pseudo-code is written in a non-deterministic style such that the "select" operation may result in many possibilities, each of which is explored separately with its own independent set of temporal constraints. A "post" operation may detect that the temporal constraints have become inconsistent, in which case the possibility being explored may be abandoned (e.g., recorded as infeasible). Any remaining feasible orderings may be added to a search queue. The planner may then take into account all other planning constraints and select the best ordering of allocations on R according to the given objective function (e.g. maximize throughput of the manufacturing plant, minimize execution time, etc.). It will be appreciated that the foregoing may be easily modified to support non-FIFO constraints, such as last-in-first-out (LIFO), random access, and other types of capacitated resources.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of employing model-based planning of a multi-capacity print sheet buffer for machine control, comprising:
    evaluating a model of an ordered listing of allocations of a multi-capacity color print sheet buffer, which buffers fully printed color sheets as they await further action, wherein the allocations are permitted to overlap each other in time, wherein the multi-capacity color print sheet buffer outputs buffered color print sheets to be merged with more rapidly printed black and white sheets;
    selecting an insertion point for a new allocation into the ordered listing of allocations of the multi-capacity color print sheet buffer;
    posting one or more temporal constraints that govern an order of execution of allocations;
    determining whether execution of the model is feasible after insertion of the new allocation at the selected insertion point; and
    storing the model for comparison and/or execution if it is feasible.

2. The method of claim 1, further comprising comparing a plurality of models, each with a different selected insertion point for the new allocation.

3. The method of claim 2, further comprising evaluating the plurality of models in parallel to minimize processing time.

4. The method of claim 2, further comprising selecting a model for execution based on a level of feasibility relative to other models.

5. The method of claim 4, further comprising executing the selected model.

6. The method of claim 1, further comprising executing the model.

7. The method of claim 1, wherein the one or more temporal constraints comprises a first-in-first-out constraint.

8. The method of claim 1, wherein the one or more temporal constraints comprises a serial constraint that ensures that an Nth allocation is complete before the new allocation is started, where N is an integer.

9. A system that facilitates model-based planning for a multi-capacity print sheet buffer, comprising:
    a planner that selects an insertion point for a new allocation into an ordering of existing allocations of the multi-capacity color print sheet buffer, which buffers fully printed color sheets as they await further action, wherein the allocations are permitted to overlap each other in time, and wherein the multi-capacity color print sheet buffer outputs buffered color print sheets to be merged with more rapidly printed black and white sheets;
    a plan generator that specifies at least one temporal constraint on allocations of the multi-capacity color print sheet buffer;
    a plan tester that determines whether a new ordering of allocations, which comprises the new allocation at the selected insertion point, is feasible in view of the specified constraints; and
    a memory that stores a model of the new ordering of allocations of the multi-capacity print sheet buffer if the new ordering of allocations does not violate the at least one temporal constraint.

10. The system of claim 9, wherein the multi-capacity color print sheet buffer is employed in a xerographic machine.

11. The system of claim 10, wherein the ordering of allocations is an ordering of pages to be passed through the sheet buffer, and wherein the new allocation is a new page that is inserted into the ordering of pages.

12. The system of claim 11, wherein the at least one temporal constraint comprises a first-in-first-out (FIFO) constraint that ensures that a first page enters the sheet buffer before a second page enters the sheet buffer, and leaves the sheet buffer before the second page leaves the sheet buffer.

13. The system of claim 12, where the at least one temporal constraint further comprises a capacity-based constraint that ensures that a maximum capacity associated with the sheet buffer is not exceeded.

14. The system of claim 13, wherein the capacity-based constraint stipulates that a current page does not enter the sheet buffer until an Nth preceding page has left the sheet buffer, where N is an integer equal to the maximum capacity of the sheet buffer.

15. The system of claim 9, wherein the plan tester determines whether the new ordering of the allocations of the multi-capacity resource violates the at least one temporal constraint.

16. The system of claim 15 wherein the planner abandons the new ordering of allocations if the at least one temporal constraint is violated.

17. The system of claim 9, wherein the planner compares a plurality of stored models and selects an optimal model for execution to maximize throughput.

18. A print platform, comprising:

one or more xerographic components that execute instructions for performing a xerographic process;

a planner that selects an insertion point for a new allocation into an allocation ordering of a multi-capacity color print sheet buffer that buffers fully printed color sheets as they await further action, generates an updated allocation ordering, and assigns at least one temporal constraint to govern the allocation ordering, wherein allocations in the allocation ordering are permitted to overlap each other in time, and wherein the multi-capacity color print sheet buffer outputs buffered color print sheets to be merged with more rapidly printed black and white sheets; and a plan tester that determines updated allocation ordering feasibility as a function of whether the updated allocation ordering violates the at least one temporal constraint.

* * * * *